3 Sheets--Sheet 1.

J. WEED.
Automatic Gates.

No. 152,888. Patented July 7, 1874.

Witnesses.
James Martin Jr.
J. N. Campbell.

Inventor.
James Weed
by his attys
Mason Fenwick Lawrence

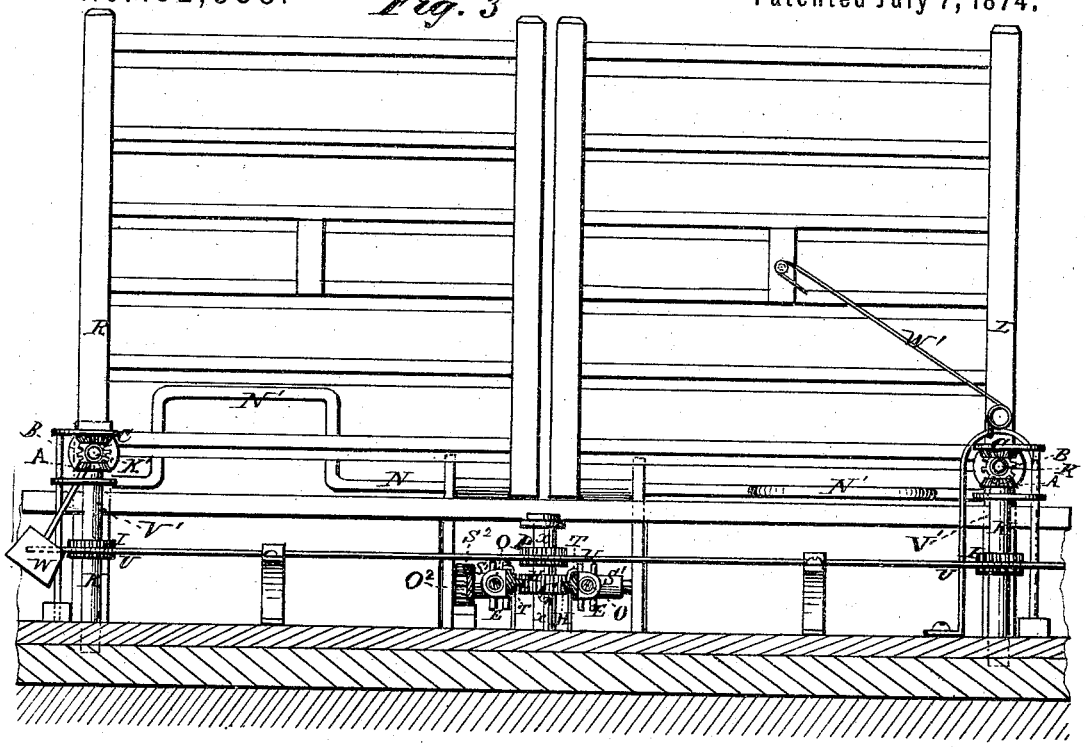
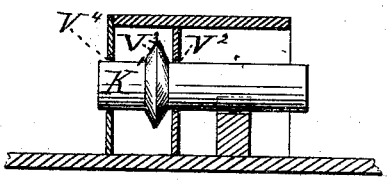
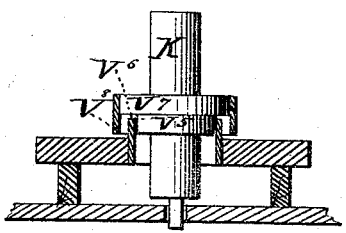
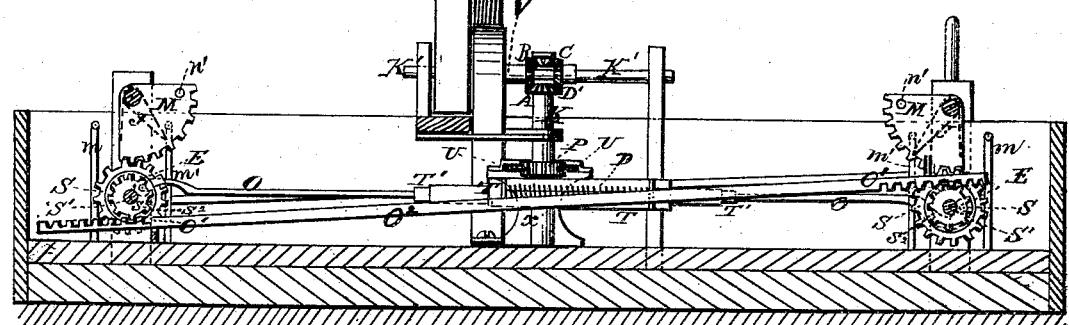

J. WEED.
Automatic Gates.

No. 152,888.

3 Sheets--Sheet 3.

Patented July 7, 1874.

UNITED STATES PATENT OFFICE.

JAMES WEED, OF MUSCATINE, IOWA.

IMPROVEMENT IN AUTOMATIC GATES.

Specification forming part of Letters Patent No. 152,888, dated July 7, 1874; application filed April 23, 1874.

*To all whom it may concern:*

Be it known that I, JAMES WEED, of Muscatine, county of Muscatine, State of Iowa, have invented a new and useful Improvement in Automatic Farm and other Gates; and I do hereby declare that the following is a full, clear, and exact description thereof, reference being had to the accompanying drawings making part of this specification, in which—

Figure 2:
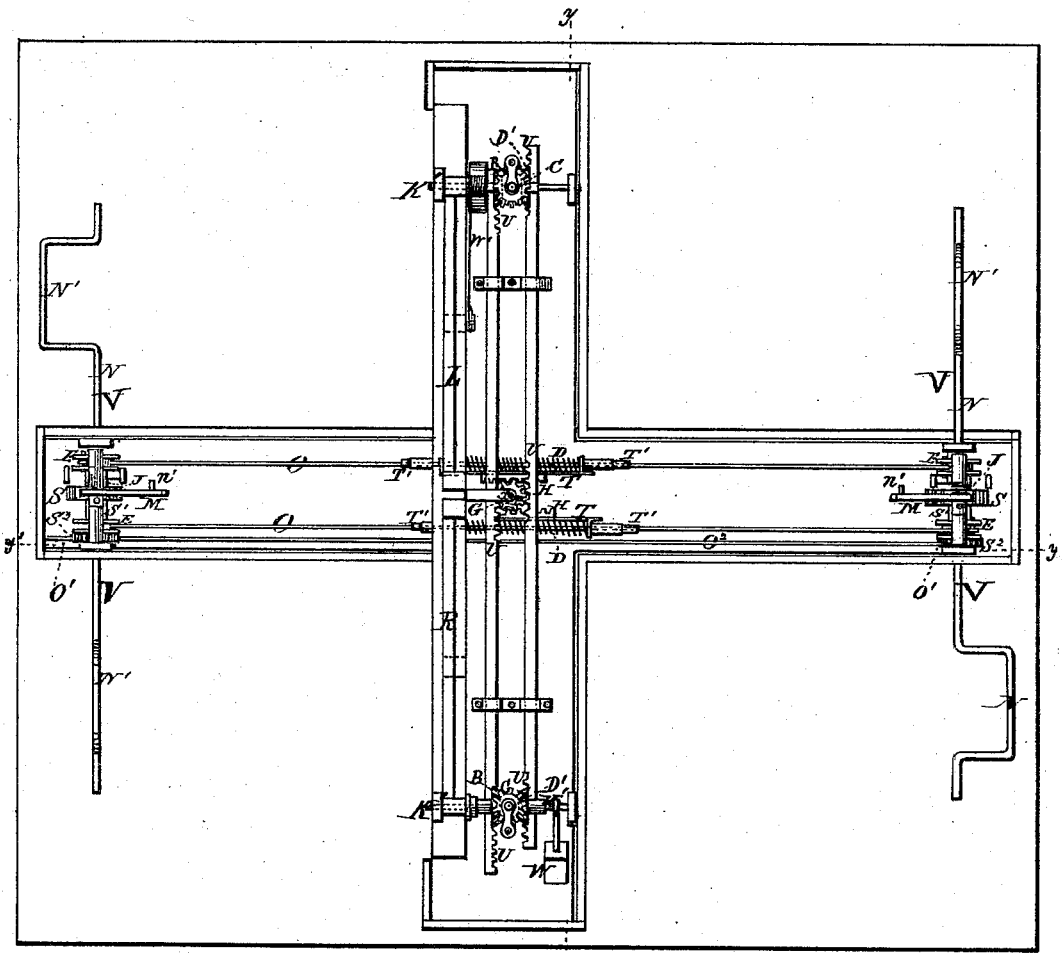
Figure 1:
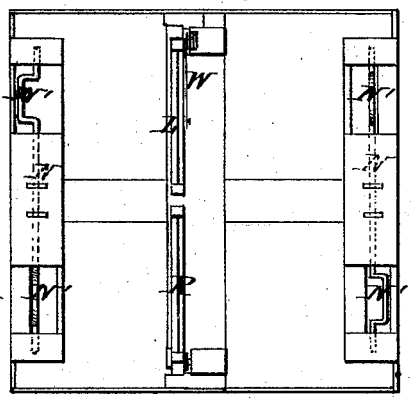
Figure 7:
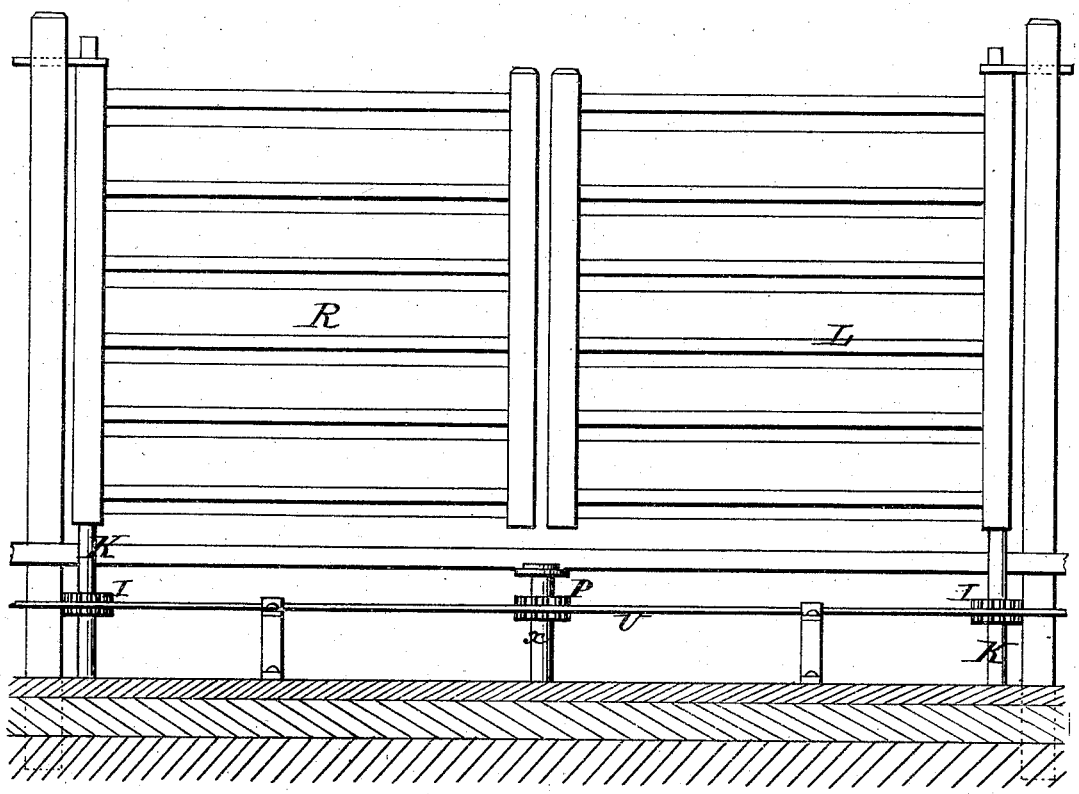

Figure 1 is a plan view of my automatic gate as in use. Fig. 2 is a plan view of the mechanism by which the gate is opened. Fig. 3 is a vertical section in the line $y\,y$ of Fig. 2. Fig. 4 is a section in the line $y'\,y'$ of Fig. 2. Fig. 5 is a section of a horizontal snow and water tight joint which I provide for the shafts of the mechanism. Fig. 6 is a section of the vertical snow and water tight joint which I provide for the shafts of the mechanism. Fig. 7 shows a horizontally-swinging gate arranged to be operated with my invention.

Similar letters of reference indicate corresponding parts in the several figures.

My invention is designed to overcome difficulties hitherto experienced in operating automatic gates. Such gates are operated by two general methods—viz., by levers, cords, and pulleys, &c., controlled by hand, and by the force of the vehicle acting upon a wheel-bar having quadrilateral cranks, moving the gate out of equilibrium when the unsupported gravity of the gate opens or closes it.

The nature of my invention consists in certain construction and combinations, as hereinafter described, whereby the said force of elasticity is employed for the purpose named, whereby, also, automatic gates are greatly improved in their operation in other respects.

In the accompanying drawings, N N are wheel-bars, with cranks N' N', wide enough apart to prevent narrow or low sleighs being caught on the rising crank, which sometimes happens when the cranks are close together. M M are toothed segment-wheels, firmly fixed to the wheel-bars N N, and working into spur-gear wheels S S, of about one-half the radial diameter of the segment-wheels M M; consequently the wheels S S make a half-revolution, more or less, while the segments M M perform one-quarter. J J are small springs attached to the fixed bearings of the segments M M, and bearing against fixed stops $m\,m'$ as the segments make their vibrations. These springs are operated by pins $n\,n'$, projecting from the sides of the segments, and serve to counteract the weight of the horizontal cranks N' N' of the wheel-bars N N, and diminish the resistance to the wheel of a vehicle on its first impact with the cranks. On the axles S' S' are crank-pins E E E E, carrying rods O O, which extend from one wheel crank-bar, N, to the other, and move in opposite directions with the half-rotations of the axles S' S', to which they are attached. These rods O O have flanged slides T, connected by a side plate or shuttle-bar arranged upon them between fixed stops T' T'. These stops, by the motion of the rods, compress the motor-springs D D in either direction, accordingly as the rods are moved. On one side of each of the shuttle-bars of the slides T T, a short toothed rack, H, is fastened. These racks work into a spur-gear, G, which is on a vertical axle, $x$—that is, on opposite sides of the wheel. The axle $x$ has another spur-wheel, P, on it just above the wheel G, and in the same plane with the wheel P there are similar spur-wheels I I on vertical axles K. $S^2\,S^2$ are spur-wheels on the shafts $S^1\,S^1$. U U are rack-bars gearing with the wheels P I I, and $O^1$ are toothed racks on the bar $O^2$, gearing with the spur-wheels $S^2\,S^2$. The spur-wheels P and I I are moved simultaneously by the rack-bars, said bars moving longitudinally in reverse directions, and taking hold of them on opposite sides, and the spur-wheels $S^2\,S^2$ are operated in reverse directions by the racks $O^1\,O^1$ of bar $O^2$. The operation of the rack-bars U U is to vibrate the shafts K K in reverse directions, and thereby assist in opening the gate; and the operation of the racks $O^1\,O^1$ is to move the crank-pins off their centers.

From the drawing it will be seen that the wheel crank-bars are arranged on opposite sides of the place where the gate-sill is located, and also that the connecting-rods between the cranks, and also the rack-bar $O^2$, which runs parallel with the connecting-rods, are crossed, just about where the sill of the gate is located, by the rack-bars U U, said bars U U extending to the points where the hinge shafts or axles K' K' of the gate are located.

The mechanism thus far described is applicable to the opening and closing of horizontal swinging gates, the fixed axles for such gates being extended below the ground, as in Fig. 7, in the place of the short axles K K, which are required in operating gates which swing vertically, or as in the drawings.

In order to operate a vertically-swinging gate, such as L R, it is expedient to combine, with the mechanism described, gear-wheels A B C D' in duplicate, A and B being necessarily arranged as shown. The wheel B for one half of the double gate is fixed to the axle-shaft K' of the part L, and D' is left loose on said axle. The wheel A is fast on shaft K, and the wheel C is suspended by a bracket, so as to gear with wheels B and D'. The wheels A B C D' for the other half of the double gate are arranged in precisely the same way, except that D' is fixed to the axle K', and B is loose. The parts L R, forming the divided vertically-swinging gate, are fixed by their lower rear corners to the horizontal axles of the wheels B, and in order to balance the parts, a spring, W', or a weight, W, is employed, as shown; or the combined force of the spring and weight may be utilized, as deemed best for this purpose.

The mechanism for operating the gate is placed below ground, except the axles of the gates and wheel-bar cranks, and covered, as shown in Fig. 1. In practice it is important to exclude water and snow from the working parts and the chambers below; therefore, at V a snow and water joint should be provided on a horizontal axle, and at $V^1$ on a perpendicular axle. The horizontal snow and water joint is shown on an enlarged scale in Fig. 5. This joint consists of a close-fitting inner joint, $V^2$, and outside of this, upon the axle, is an elevated ridge, $V^3$, which prevents water running along it to the close joint $V^2$, and outside of this at $V^4$ is a joint enough open to prevent ice from fastening the axle. The inner close joint prevents the free circulation of air, and consequently snow is not blown in. This horizontal joint is also applicable to the wheel-bar crank-shafts.

The perpendicular snow and water joint required at $V^1$, and upon the perpendicular axles (extending below ground) of horizontally-swinging gates, is shown on an enlarged scale by Fig. 6. It consists of a projecting shoulder, $V^5$, upon the axle, against which the upper edge of a circular band, $V^6$, rising from the floor below, works closely, and above this close joint another circular shoulder, $V^7$, projects still farther from the axle, and from the outer edge of this shoulder a circular band, $V^8$, depends nearly to the floor below. This band $V^8$ prevents water and ice from interfering with the close snow-joint formed by $V^5$ and $V^6$.

The operation of the main or spring-motor mechanism is as follows: The crank of a wheel-bar being thrown down, the stops T' T' at one end of each shuttle or slide bar T are forced against the flange of the bar. This compresses the motor-springs D D against the flanges at the opposite end of the shuttle or slide bars, and the rods O O being held on the center, the force of the springs D D is expended, moving the shuttle-bars and giving motion to the axle $x$, which transmits it by the racks U U to the axles K K, and these in turn to the gate, directly, if it be a horizontally-swinging one, or indirectly to the vertically-swinging gate through the miter-wheels A B C D'. The effect of the spring-motors upon the gearing just named is as follows: One half of it is expended on wheel B by direct contact, and the other half is transmitted through C and D' to A on the opposite side from that of the direct contact, thus relieving the journal of the axles K' from the leverage of the wheels, and also doubling the working strength of the gearing—a great advantage where wheels of great dimensions are not admissible.

It might be found practicable to use but one motor-spring D for turning the axle $x$, but such spring would require to be of greater strength and would increase the friction.

What I claim as new, and desire to secure by Letters Patent, is—

1. The combination of the axle $S^1$, carrying wheels S $s$ and crank-pin E; rod $o$, having stop T', slide T, and rack H applied to it; the motor-spring D, spur-gear G, spur-wheels I and P, rack-bar U, shaft or post K, and crank bar or shaft N, having a toothed segment or wheel, M, applied to it, substantially as and for the purpose herein described.

2. The combination of the springs D D, slides T T, and racks H H with the rack-bars U U, gear-wheels P and I I, rods O $O^1$ $O^2$, wheels S S $S^2$ $S^2$ $s$ $s$, crank-pins E E, segments M M, crank-shafts N N, and gate shaft or post K, substantially as and for the purpose described.

3. The post or shaft K, constructed with the projections $V^5$ and $V^7$, and with the flange $V^8$, in combination with the step-box having the flange $V^6$, substantially as shown and described.

4. The shaft K', having the flange or collar $V^3$, in combination with the bearing-box having the flanges $V^2$ $V^4$, substantially as and for the purpose set forth.

5. As an intermediate motor for an automatic gate, the spring D, applied on the rod $o$, between the ends of a toothed slide, T, which is controlled in its extent of movement by stops T' on the rod, substantially as and for the purpose set forth.

JAMES WEED.

Witnesses:
F. A. UNDERWOOD,
A. B. BROWN.